United States Patent Office 3,057,614
Patented Oct. 9, 1962

3,057,614
RESINOUS COMPOSITIONS
Sylvan Owen Greenlee, 343 Laurel Drive,
West Lafayette, Ind.
No Drawing. Filed Mar. 21, 1960, Ser. No. 16,136
12 Claims. (Cl. 260—23.7)

This invention relates to heat-reactive mixtures of epoxides and phenols. More particularly, the invention relates to mixtures of polyepoxides, phenol addition products of butadiene polymers and phenol addition products of certain unsaturated compounds including oils and to the reaction of such mixtures to give flexible, infusible, insoluble products.

In the co-pending Greenlee application, Serial No. 833,144, phenol addition products of butadiene polymers are described as valuable materials for reaction with polyepoxides to give insfusible, insoluble products possessing unusually high resistance to chemicals and solvents. Such mixtures of phenol addition products of butadiene polymers with polyepoxides on conversion not only exhibit unusually high chemical and solvent resistance as coatings, but the nonconverted mixtures, in general, have the unusual advantage of solubility in aromatic hydrocarbon solvents as compared to the requirement for most highly chemically resistant coating materials that the solvent be of the lacquer type including low molecular weight esters and ketones. The aromatic hydrocarbon solvents are economically advantageous and also have less tendency when used in coating applications to dissolve undercoats as compared to formulations using the ester and ketone solvents. The phenol addition products of the butadiene polymers are reactive with the polyepoxides through phenolic hydroxyl groups contributed by an appreciable portion of the phenol addition taking place through hydroxyphenylation. Such hydroxyphenylated materials have some limitation in certain cases in contributing sufficient flexibility to the reaction products with polyepoxides. Another limitation is that many of the phenol addition products of butadiene polymers have very high melting points so that mixtures thereof with solid polyepoxides are characterized by mixed melting points above the reaction temperature of the polyepoxides with the hydroxyphenylated materials after a catalyst has been added, thus making it impossible to introduce the catalyst into the molten mixture for molding and casting applications where solvents cannot be used.

It is, therefore, a principal object of this invention to prepare modifications of the hydroxyphenylated butadiene polymers which readily can be reacted with resinous and nonresinous polyepoxides to form flexible, infusible, insoluble products.

It is yet another object of the invention to provide physical mixtures of hydroxyphenylated butadiene polymers and hydroxyphenylated derivatives of certain unsaturated compounds, including oils.

It is a further object of this invention to prepare physical mixtures of hydroxyphenylated butadiene polymers, hydroxyphenylated derivatives of certain unsaturated compounds including oils and polyepoxides which may be converted to flexible, infusible, insoluble products on the application of heat.

It is a further object of this invention to prepare flexible, insoluble, infusible products by the reaction of mixtures of hydroxyphenylated butadiene polymers, hydroxyphenylated derivatives of certain unsaturated compounds including oils and polyepoxides.

It has now been found that mixtures, in all relative proportions, of hydroxyphenylated butadiene polymers with hydroxyphenylated unsaturated compounds including oils of the vegetable and animal type may be used in reaction with the resinous or nonresinous polyepoxides to give insoluble, infusible products possessing a wide variation in flexibility. Such mixtures may also be formulated to give a wide variation in the softening points of the nonconverted mixtures. In fact, such nonconverted mixtures may vary from high viscosity liquids at room temperature to high melting solids.

The invention more generically contemplated physical mixtures of (a) thermoplastic hydroxyphenylated-phenyletherated polymers prepared by reacting a phenol selected from the group consisting of the monohydric and dihydric phenols having at least one unsubstituted ortho- or para-position on the aromatic nucleus to which a phenolic hydroxyl group is attached with unsaturated polymeric material selected from the group consisting of butadiene and its homologues and copolymers of butadiene and its homologues with vinylly (i.e., 1,2-ethylenically) unsaturated monomeric materials which form saturated polymers, said unsaturated polymers prior to reaction with the phenol having at least an average number of olefinic double bonds determined by the formula $$y = \frac{10}{2x-1}$$

where $y$ is the number of olefinic double bonds and $x$ is equal to the functionality of the phenol; said hydroxyphenylated-phenyletherated polymers being soluble in aromatic hydrocarbon solvents and having a total phenol addition of at least 10% by weight, a phenol addition as hydroxyphenyl of at least 3.5% by weight, said phenol additions being expressed in equivalents of phenol at a unit weight of 94, an average of at least 2.5 phenolic hydroxyls per molecule, and a Durran softening point of at least about 50° C.; and (b) hydroxyphenylated-phenyletherated compounds prepared by reacting a phenol with an unsaturated material selected from the group consisting of (1) the unsaturated aliphatic acids having from about 12 to 22 carbon atoms per molecule; (2) natural oils which are glycerol esters of the acids contemplated by (1); (3) synthetic esters of the acids contemplated by (1) with monohydric and polyhydric alcohols; (4) phenolic esters of the acids contemplated by (1); (5) unsaturated aliphatic alcohols containing from about 12 to 22 carbon atoms per molecule; (6) esters of the unsaturated alcohols contemplated by (5) of carboxylic acids, said material prior to reaction with said phenol having an average of at least two double bonds per molecule, said hydroxyphenylated compound having a total phenol addition of at least about 15% by weight, a phenol addition as hydroxyphenyl of at least about 10% by weight, said phenol additions being expressed in equivalents of phenol at unit weight 94, and an average of at least about 2 phenolic hydroxyls per molecule.

The hydroxyphenylated, phenyletherated polymers contemplated by this invention, and appropriate methods for the preparation thereof, are disclosed in co-pending Greenlee application Serial No. 833,144, the pertinent disclosure of which is incorporated herein by reference.

As elucidated in said co-pending application Serial No. 833,144, butadiene reacts to form polymers composed of 1,3- and 1,4- addition units, each unit being a C4 chain containing a double bond.

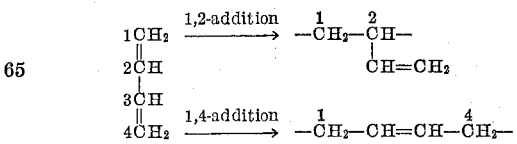

Depending on the source of the butadiene polymer or the catalytic method used in its formation, the 1,2- and 1,4- units may appear in random or they may be specific to 1,2- units or to 1,4- units.

A number of butadiene homologues and derivatives polymerize in a similar fashion. Some of these compounds are 2-methylbutadiene, 2-chlorobutadiene, 1-methylbutadiene and 2,3-dimethylbutadiene.

Also generically embraced by the invention are mixtures of the hydroxyphenylated-phenyletherated, polymers (*a*), the hydroxyphenylated-phenyletherated unsaturated material (*b*) and polyepoxides.

Active vinyl compounds also react to form polymers,

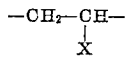

Well known vinyl compounds are styrene (X=phenyl), vinyl acetate (X=O$_2$CCH$_3$), vinyl chloride (X=Cl), and methyl acrylate (X=CO$_2$CH$_3$). The butadiene compounds may be copolymerized with the vinyl compounds to give polymers containing the butadiene addition units

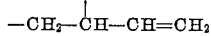

and —CH$_2$—CH=CH—CH$_2$—, and the vinyl units

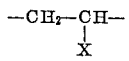

It will be seen that the butadiene units contribute to both the polymers and copolymers the unsaturated C4 units. The unsaturated C4 units are present in the copolymers in an amount directly proportional to the molar quantity of the butadiene compound entering the polymer composition.

It is the olefin unsaturation of the butadiene polymers that is reacted with phenol to give the phenol addition products which are used in the reaction mixtures described herein. In the reaction of phenols with the unsaturated butadiene polymers, it was found that a part of the phenol adds to the olefin double bond by direct addition to form phenyl ether groups while another portion of the phenol adds to the olefin double bonds by alkylation to form a hydroxyphenyl group. The reaction to form phenyl ether groups in conjunction with hydroxyphenylation has proved to be beneficial to the characteristics of the modified polymers in that their miscibility with coupling agents such as the polyepoxides and their solubility in aromatic hydrocarbon solvents is greatly enhanced thereby. The enhanced miscibility through the presence of the phenyl ether groups appears to introduce no physical or chemical weakness as the phenyl ether group is very stable towards heat and chemical reactivity.

As disclosed in application Serial No. 16,918, which is a continuation-in-part of application Serial No. 833,144 filed August 12, 1959, the degree of hydroxyphenylation as opposed to phenyletheration is a function of the phenol concentration—maximum hydroxyphenylation being achieved when about four mols of phenol per alkylation equivalent of polymer or unsaturated material is employed.

The butadiene polymers used in reaction with phenols to form the hydroxyphenylated-phenyletherated products are preferably of sufficiently low molecular weight so as to be liquid at the reaction temperature or sufficiently soluble in organic solvents so that the reaction with phenol may be conducted in the liquid state to give addition products which remain solvent soluble. Typical butadiene polymers and copolymers which are used to experimentally illustrate the preparation of hydroxyphenylated-phenyletherated butadiene polymers used in combination with the phenol addition products of unsaturated oils and polyepoxides are listed as follows:

(1) Squalene—a natural polymer of isoprene (hexaisoprene) obtained as an extract from fish oils.

(2) Buton 100 (formerly referred to as C–Oil and MD420)—obtained from Enjay Company, Inc., described as a copolymer of butadiene and styrene having a molecular weight in the range of 8,000 to 10,000, an iodine value of approximately 300, and a composition of approximately 80 parts butadiene and 20 parts styrene. The butadiene content is described as composed of approximately 40% 1,4- addition and 60% 1,2- addition. Buton 100 has a specific gravity of 0.915 at 25° C. and a viscosity of around 10 poises as a 90% solution in toluene.

(3) Butarez (Phillips Petroleum Company)—represents liquid butadiene polymers composed of approximately 55–65% 1,2- addition and 35–45% of 1,4- addition units. There are, in these polymers, an average of 0.8 double bond per C4 unit giving iodine values of 375 to 400.

Butarez 5 has a viscosity of 36–37 poises at 25° C. and 5.5 poises as a 90% solution in toluene at 25° C.

Butarez W has a molecular weight of around 1,800; a viscosity of 98–100 poises at 25° C. and a viscosity of 12–13 poises as a 90% solution in toluene at 25° C.

(4) Naugapol 1022 (Naugatuck Chemical Division of United States Rubber Company)—a synthetic rubber copolymer of butadiene and styrene.

(5) Shell Isoprene Rubber (Shell Chemical Corporation)—described as possessing physical properties which approximate those of natural Hevea rubber. Chemically, it is a steriospecific isoprene polymer- an essentially cis-1,4-polyisoprene.

Butadiene polymers readily react with phenols to give the new phenol addition products when proper catalysts are used. Convenient catalysts for the preparation of the phenol addition products of butadiene polymers were found to include boron trifluoride, aluminum chloride and aluminum phenoxide. Using BF$_3$ it was found to be convenient to carry out the reaction of the unsaturated polymer with phenol in the temperature range of 25–250° C. The temperature and reaction time vary with the particular combination of phenol and polymer used as well as the final properties desired in the phenol addition product. Reaction at lower temperatures, for example at 25–50° C., tends to produce products having somewhat lower softening points as compared to the products prepared at higher temperatures. Since the unsaturated polymers are subject to further polymerization through their olefin double bonds, it is also likely that such polymerization is taking place to an appreciable extent during the phenol addition reaction. In general, the phenol addition products prepared at temperatures above 60° C. are in most cases brittle solids while some of the products prepared at the lower temperatures are viscous liquids or sticky solids. Similar results in phenol addition to the butadiene polymers result when aluminum chloride is used as the catalyst. Aluminum phenoxide was also found to be an excellent catalyst for the addition of phenol to the unsaturation of butadiene polymers. In its use as a catalyst, it is usually introduced as aluminum turnings or aluminum foil to the phenol to be used in the reaction followed by heating with agitation at 150–250° C., depending on the phenol, until all of the aluminum has dissolved after which the unsaturated butadiene polymer is added thereto. Preparations using the aluminum phenoxide catalysts are conveniently carried out in the temperature range of 50–300° C. With the various types of catalysts as illustrated with boron trifluoride, aluminum chloride and aluminum phenoxide, there results in all cases a good balance between hydroxyphenylation and phenol ether formation to give the highly desired properties of the phenol addition products.

The hydroxyphenylated compounds which are combined with the hydroxyphenylated polymers in accordance with the invention are prepared by reacting phenol with an unsaturated material having an average of at least two double bonds per molecule and selected from the group consisting of (1) the unsaturated aliphatic acids having from about 12 to about 22 carbon atoms per molecule; (2) natural oils which are glycerol esters of the acids contemplated by (1); (3) synthetic esters of the acids contemplated by (1) with monohydric and polyhydric alcohols; (4) phenolic esters of the acids contemplated by (1); (5) unsaturated aliphatic alcohols containing from about 12 to about 22 carbon atoms per molecule; (6) esters of the unsaturated alcohols contemplated by (5) of carboxylic acids.

Representative unsaturated aliphatic acids having from 12 to 22 carbon atoms per molecule contemplated by the invention are palmitoleic, oleic, isomeric linoleic, isomeric linolenic, licanic, eleosteoric, clupanodonic, erucic and arachidonic acids.

Representative natural oils contemplated by the invention include cod liver, corn, cottonseed, herring, kapok, lark, linseed, menhaden, mustard, neat's foot, oiticica, olive, palm, peanut, perillo, poppyseed, rapeseed, rice bran, safflower, salmon, sardine, seasame, shark-liver, soyabean, sunflower, tall, tung and whale oils.

The invention in its generic scope contemplates all of the various aliphatic monohydric and polyhydric alcohol esters of the acids of Category 1. It is the intention of this disclosure to include each of the various species of alcohols falling within the scope of the foregoing generic definition inasmuch as the specified unsaturation of the ester molecule, rather than the specific alcohol from which the ester is derived, is the essential feature upon which utility of the esters in the invention depends. The preferred alcohols contain from about 1 to about 22 carbon atoms. Representative alcohols are methanol, ethanol, 1-propanol, 1-butanol, 1-pentanol, 1-hexanol, 1-oxtanol, 1-nonanol, 1-decanol, 1-hendecanol, 1-dodecanol, 1-tridecanol, 1-tetradecanol, 1-pentadecanol, 1-hexadecanol, 1-heptadecanol,1-octadecanol, 1-nonadecanol, 1-eicosanol, 1-heneicosanol, 1-docosanol, and the various isomers and unsaturated analogues thereof.

The invention likewise generically embraces all phenolic esters of the acids contemplated by Category 1. More particularly, the invention contemplates without limitation all of the various esters of such acids with all of the various monohydric, dihydric and trihydric phenols. Representative esters are derived from the various alkyl phenols such as phenol; ortho-, meta-, and para-cresol; ortho-, meta-, and para-ethyl phenol; ortho-, meta-, and para-propyl and isopropyl phenol; ortho-, meta-, and para-n-butyl, isobutyl and t-butyl phenol; ortho-, meta-, and para-phenyl phenol; xylenol; resorcinol; phloroglucinol; and the various naphthols such as alpha- and beta-naphthol.

The invention embraces without limitation all unsaturated aliphatic alcohols containing at least two double bonds per molecule and from about 12 to about 22 carbon atoms per molecule as starting materials for the production of hydroxyphenylated compounds. Preferred alcohols are prepared by the selective catalytic reduction of the various vegetable oils, which are glycerides of 12 to 22 carbon atom unsaturated fatty acids. Typical unsaturated alcohols are those obtained by converting to alcohol groups the carboxyl groups of isomeric linoleic, eleosteoric, erucic, arachidonic and clupanodonic acids and converting both the carboxyl and ketone groups of licanic acid to alcohol groups using selective hydrogenation methods which leave the olefin group unaffected.

The invention further contemplates hydroxyphenylated compounds produced from esters of the foregoing unsaturated alcohols with all of the various aliphatic and aromatic mono- and poly-carboxylic acids. It should be noted that 12–22 carbon mono-olefinic alcohols when esterified with polybasic acids contain at least two olefin groups per molecule and are useful in preparing hydroxyphenlated oil derivatives which fall within the scope of this invention. It is the intention of the disclosure to embrace individually esters derived for each of such acids, and preferably those acids which contain from about 1 to about 20 carbon atoms. Representative acids include formic acid, acetic acid, the various isomeric propionic acids, butyric acids, pentanoic acids, hexanoic acids, octanoic acids and the like, together with the unsaturated analogues thereof. Representative aliphatic polybasic acids include itaconic acid, succinic acid, maleic acid, tartaric acid and the like. It will be appreciated that the functional characteristic of the esters contemplated resides in the presence in the ester molecule of two or more olefinic double bonds. Hence, the specific acids and alcohols from which the esters are derived do not constitute the essence of the invention, which contemplates hydroxyphenylated derivatives of each of the esters embraced by the foregoing generic definition.

The hydroxyphenylated derivatives of such unsaturated materials are appropriately prepared in the same manner as the phenol addition products of butadiene polymers as previously described.

Suitable catalysts for the hydroxyphenylation of the unsaturated oil derivatives are boron trifluoride and aluminum chloride. It has been found convenient to react the unsaturated materials with phenol in the presence of such catalysts as boron trifluoride and aluminum chloride in the temperature range of 25–250° C. As in the reaction of phenols with the butadiene polymers, it has been found that catalytic addition of phenol to the unsaturated materials including oils results in a mixture of hydroxyphenylation and phenyletheration of the double bonds so that a mixed product results. Such mixed hydroxyphenylated-phenyletherated unsaturated compounds have proven to have excellent miscibility with the phenol addition products of the butadiene polymers, with the polyepoxides and with aromatic hydrocarbon solvents.

The phenol addition products of unsaturated materials particularly useful in the invention are characterized by a total phenol addition of at least about 15% by weight, a phenol addition as hydroxyphenyl of at least about 10% by weight, said phenol additions being expressed in equivalents of phenol at unit weight 94, and an average of about two phenolic hydroxyl per molecule.

In regard to the hydrophenylation of the unsaturated materials contemplated by the invention, it has been determined that a substantially greater proportion of the double bonds present may react than in the case of the butadiene polymers as contemplated specifically by copending application S.N. 833,144. Moreover, the percent phenol addition is higher with the unsaturated materials than in the case of the hydroxyphenylated butadiene polymers.

In order to supplement the unsaturated oil derivatives available in experimental or commercial quantities from their manufacturers, a group of special esters were prepared and are described as Examples A through E.

EXAMPLE A.—A SOYA BEAN ACID ESTER OF UNSATURATED 18 CARBON ALCOHOLS

In a 3 liter 3-neck flask provided with a thermometer, a mechanical stirrer, and a Dean Stark attached reflux condenser was placed 700 grams of soya bean oil acids and 700 grams of Unadol 40. Unadol 40 is a mixture of 18 carbon alcohols available from the Archer Daniels Midland Company and having an acid value of 0.01, a hydroxyl value of 208, an iodine value of 120.4, and a saponification value of 1.6. The reaction mixture was heated with constant stirring to 250° C. at which point sufficient amount of toluene was added through the reflux condenser to give constant refluxing of the solvent during the high temperature esterification enabling removal of water through the water trap. After heating for 1 hour and 6 minutes at 245–251° C. the residual product had an acid value of 4.7. At this point the pressure was reduced by the use of a water pump and the heating at 245–251° C. continued for another hour. The pressure during the final stripping period was reduced to about 8 mms. mercury pressure. The resulting ester had a viscosity (Gardner-Bubble Viscosimeter) of B and a color (Gardner-Hellige) of 8.

EXAMPLE B.—TALL OIL ACID ESTER OF BIS-(4-HYDROXYPHENYL) DIMETHYL METHANE, KNOWN COMMERCIALLY AS BIS-PHENOL A (BPA)

In a 5 liter 3-neck flask provided with a thermometer, a mechanical stirrer and a reflux condenser was placed 1130 grams of BPA and 1122 grams of acetic anhydride. This mixture was heated at reflux with continuous agitation for a period of one hour. The temperature ranging from 134–143° C. At this point 2240 grams of Aconew-Extra tall oil acids were added to the reaction mixture and the regular reflux condenser was replaced with a Dean-Stark reflux condenser. The Aconew-Extra tall oil acids have an acid value of 194, an iodine value of 130, a rosin acid content of 1% and a fatty acid content of 98% composed of 45% linoleic acid, 54% oleic acid and 1% saturated acids. Heating was contained allowing the excess acetic anhydride and acetic acid to distill into the Dean-Stark trap where it was recovered. When the temperature of the reaction mixture reached 200° C. a slow stream of carbon dioxide was passed through. The constantly agitated reaction mixture was heated at a temperature of 240–251° C. for a period of 2 hours and 40 minutes reducing the pressure by use of a water pump during the last hour of this heating period finally reducing the pressure with a vacuum pump to 3 mms. of this mercury during the last few minutes. The resulting ester had an acid value of 1, a viscosity of J and a color of 7.

EXAMPLE C.—TERTIARY BUTYL BENZOIC ACID ESTER OF UNSATURATED 18 CARBON ALCOHOLS

In a similar manner to that in Example A, 407 grams of p,t-butyl benzoic acid and 933 grams of Unadol 90 were esterified to an acid value of 7.9, a viscosity of A and a color of 11. The mixed unsaturated alcohols, Unadol 90, available from the Archer Daniels Midland Company had an acid value of 3, a hydroxyl value of 209, an iodine value of 173 and saponification value of 3.6.

EXAMPLE D.—THE ACETATE OF UNSATURATED 18 CARBON ALCOHOLS

In a 3 liter flask provided with a thermometer, a mechanical stirrer, and a reflux condenser was placed 612 grams acetic anhydride and 1400 grams Unadol 90. The reaction mixture was heated at a refluxing temperature of 140–151° C. for a period of about 2 hours. The reflux condenser was then replaced with a Dean-Stark attached reflux condenser and the heating continued to a temperature of 200° C. removing the unreacted acetic anhydride and acetic acid through the Dean-Stark trap. After 2 hours continuous heating at 193–200° C. an acid value of 3.6 had been attained. Heating for another 2 hours at 180–200° C. at a pressure ranging from 14 to 20 mms. mercury gave a product having a viscosity of A4 and a color of 10.

EXAMPLE E.—THE ADIPATE OF UNSATURATED 18 CARBON ALCOHOLS

By the same procedure used in preparing the ester of Example A a mixture of 243 grams adipic acid and 933 grams Unadol 90 were esterified at 240–250° C. to give a product having an acid value of 7.4, a viscosity of D and a color of 11.

The procedure which was used in preparing the phenol addition products of either the butadiene polymers or the unsaturated oils using $BF_3$ catalyst as reported in Table I is given as follows:

Into a 5 liter, 3-neck flask provided with a thermometer, a mechanical agitator, a 1 liter dropping funnel, an electrical heating mantle (and a pan of tap water on hand to be used for cooling the reaction if necessary) is placed the phenol dissolved in the indicated solvent or in the phenol without solvent, and the $BF_3 \cdot$ether catalyst. The reaction mixture is raised to the indicated reaction temperature and addition of the polymer or the unsaturated oil alone or dissolved in the indicated solvent is begun. The addition of the polymer or the unsaturated oil is at such rate that the temperature does not rise above the desired reaction temperature from exothermic reaction heat. This addition is normally carried out over a period of 10–30 minutes applying heat if necessary or cooling the flask externally with a pan of tap water if required to hold the reaction temperature. At the end of the reaction period the temperature is lowered to 90° C., in cases where the reaction temperature is above this temperature, and 1500 ml. hot tap water added. With continuous agitation the mixture is heated at 80° C. for 10–15 minutes and allowed to separate into water and organic layers. In case layering is not satisfactory because of emulsification, 20 to 50 ml. acetic acid is added to the wash. The water layer is removed and the washing with 80° C. tap water repeated two more times. In some cases 100 ml. of water may be added to hydrolyze the $BF_3$ as a replacement for the three washings. The flask is then provided with a salt-ice bath cooled receiver and the mixture heated with rapid agitation until the pot temperature reaches 150–160° C. at which point the pressure is reduced to 15–20 mms. of mercury by using a water pump. The batch is held about 15 minutes at this pressure keeping the pot temperature at 150–250° C. depending on the softening point of the final product (softening points as used throughout this description were determined by Durran's Mercury Method, Journal of Oil & Colour Chemists' Association, 12, 173–5 [1929]). In order to keep the hydroxyphenylated-phenyletherated polymer sufficiently fluid for good agitation the pot temperature at this stage is maintained at an estimated 50° C. above the softening point of the final product. The hydroxyphenylated unsaturated oil products are relatively low melting ranging from liquid to low melting solids; however, the pot temperature in vacuum stripping these materials is conveniently held at about 150° C or higher in order to efficiently remove the unreacted phenol. The receiving flask is then connected to a vacuum pump and the pressure reduced to 1 to 5 mms. of mercury holding this pressure for 10–15 minutes, holding the pot temperature of the constantly agitated product at a temperature estimated to be 50° C. above the softening point. The product is poured into a suitable container and allowed to cool.

The general procedure used in preparing the hydroxyphenylation-phenyletheration products of butadiene polymers which make use of aluminum phenoxide catalyst differs from the above procedure for $BF_3$ preparation as follows:

The aluminum foil or turnings is dissolved in the phenol at a temperature of 150° C. or higher as necessary for the specific phenol after which the pot temperature is adjusted to the specified reaction temperature. With all washed batches sufficient acid is added to convert the aluminum to a water soluble salt. In cases where the batches are not washed the aluminum may remain as the phenoxide or it may be neutralized with an acid such as acetic acid so that the aluminum would remain in the product as aluminum acetate. The Al may also be conveniently removed by its precipitation as the hydroxide or as an insoluble salt such as the phosphate, oxalate, salicylate or adipate. (The tabulated examples, however, were all washed.) The procedure involving precipitation of an aluminum salt insoluble in the reaction mixture consists of adding approximately quantitative or slight excess quantities of such chemicals as water (steam if added at temperatures above 100° C.), phosphoric acid, oxalic acid, salicyclic acid or adipic acid at the end of the reaction period and removing the insoluble compound by filtration of a solvent solution of the reaction mixture either before or after removal of the phenol by distillation at reduced pressure. The solvent solution is then heated to remove the solvent using reduced pressure to remove the last traces of volatile material—particularly if the excess phenol has not been removed before the filtration. The unreacted phenol may be conveniently removed by distillation under reduced pressure after precipitation of the aluminum and before filtration. Removal of the phenol would then be followed by addition of sufficient solvent to facilitate filtration and the solvent solution free of both phenol and aluminum may then be used in formulating solvent type coatings or impregnants.

In the examples reported in Table I, the percent by weight of added phenol is the weight of recovered product minus the weight of polyene used divided by the weight of the recovered product.

The hydroxyl content was determined by reaction with acetyl chloride and titrating with alkali. An acetyl chloride-toluene solution was prepared by mixing 1.5 mols acetyl chloride with dry toluene to make 1 liter of solution. In a 250 ml. iodine flask was pipetted 10 ml. of the acetyl chloride-toluene reagent and the flask chilled in ice water followed by the addition of 2 ml. of pyridine. The flask was tightly stoppered and shaken to form a paste. The sample was added as a 50% solution in toluene in such quantity that there remained in excess 0.5 mol of acetyl chloride for each mol reacted. The flask was gently heated for 20 minutes in a water bath held at about 60° C. When first placing the flask into the bath, the stopper should be momentarily removed to expel any pressure and then be reseated firmly. During the heating period the flask should be shaken several times. After removing the flask from the bath, it was chilled in ice water. Subsequently 25 ml. of distilled water were added and shaken well. A few drops of phenolphthalein indicator were added and titration was carried out with 0.5 N methanolic KOH. A blank was run in a similar manner. Corrections were made for any free acidity of the sample and any alcoholic hydroxyl content of the basic polyene used in preparation of the hydroxyphenylated composition.

Percent OH
$$= \frac{\text{Ml. for blank} - \text{ml. for sample} \times \text{N of KOH} \times 17 \times 100}{\text{Grams of sample} \times 1000}$$

The percent hydroxyphenyl (—$\phi$OH) was calculated from the percent hydroxyl and as tabulated refers to percent hydroxyphenyl, hydroxycresyl, hydroxyxylenyl, etc., being specific to the phenol used.

The percent by weight addition of phenol minus that added as hydroxyphenyl is represented as phenyl ether ($\phi$O—), specific to the phenol used as with —$\phi$OH.

Acid values are defined as the number of milligrams of potassium hydroxide equivalent to the free acid contained in a one gram sample.

The table entiled "Polyene-Phenol Addition Products" describes illustrative examples of the reaction of phenol with various polyenes to give suitable hydroxyphenylated materials used in reaction with the polyepoxides to give the new compositions of this invention. Examples 1 through 13 describe phenol addition products prepared from butadiene polymers while Examples 14 through 27 describe phenol addition products of unsaturated oils and unsaturated oil derivatives. Some abbreviations used in the table are: L.O.=linseed oil, S.O.=soya bean oil, and Corn O.=corn oil.

*Table I*

POLYENE-PHENOL ADDITION PRODUCTS

| Ex. No. | Grams phenol and ml. solvent | Grams polyene grams oil and ml. solvent | Catalyst | Hours at ° C. | Grams product | Percent by weight added phenol | Acid value | Percent weight as OH | Percent weight as —$\phi$OH | Percent weight as $\phi$O— | Softening point ° C. |
|---|---|---|---|---|---|---|---|---|---|---|---|
| 1 | 564 (6 mols) phenol, 525 xylene. | 439 Buton 100, 525 | 45 ml. BF₃·ether | 2.4 at 100–116 | 562 | 21.8 | 4.6 | 2.13 | 11.8 | 10.0 | 186 |
| 2 | 564 (6 mols) phenol, 525 xylene. | do | 10 ml. BF₃·ether | 1.2 at 123–127 | 550 | 20.2 | 2.3 | 2.01 | 11.1 | 9.1 | 184 |
| 3 | 648 (6 mols) o-cresol, 525 xylene. | do | 45 ml. BF₃·ether | 2.6 at 100–116 | 586 | 25.2 | 1.0 | 2.09 | 13.3 | 11.9 | 185 |
| 4 | 564 (6 mols) phenol, 525 xylene. | 439 Butarez 5, 525 xylene. | do | 2.5 at 100 | 615 | 28.6 | 9.4 | 3.46 | 19.1 | 9.5 | 142 |
| 5 | 564 (6 mols) phenol, 525 xylene. | 439 Butarez W, 525 xylene. | do | 2.5 at 100–118 | 621 | 29.3 | 8.5 | 2.95 | 16.6 | 12.7 | 186 |
| 6 | 564 (6 mols) phenol | 439 Buton 100, 412 aromatic solvent b. p. 171–278° C. | 4.5 g. Al foil | 1.5 at 175 | 543 | 19.1 | 0 | 1.25 | 6.9 | 12.2 | 111 |
| 7 | 150 (1.6 mols) phenol. | 117 Buton 100, 150 xylene. | 6 ml. BF₃·phenol | 2 at 200 | 150 | 24.0 | 3.0 | 2.28 | 12.6 | 11.4 | 174 |
| 8 | 564 (6 mols) phenol, 200 toluene. | 220 Shell isoprene rubber 3280 toluene. | 10 ml. BF₃·ether | 1 at 100 | | | 1.5 | 1.13 | 6.2 | | 175 |
| 9 | 282 (3 mols) phenol, 525 xylene. | 110 Naugapol 1022, 715 toluene. | 5 ml. BF₃·ether | 1 at 100 | 136 | 19.1 | | | | | |
| 10 | 550 (5 mols) resorcinol 500 bis (2-chloroethyl) ether. | 220 Squalene, 75 bis (2-chloroethyl) ether. | 30 ml. BF₃·ether | 2.5 at 100 | 332 | 33.7 | 6.2 | 7.00 | 22.7 | 11.0 | 100 |
| 11 [1] | 141 (1.5 mols) phenol. | 200 Butarez 5, 300 xylene. | 22 g. AlCl₃ | 0.5 at 20–26, 2.0 at 70–79. | 257 | 22.2 | 0 | 1.51 | 8.3 | 13.9 | 96 |
| 12 | 1,000 (9.25 mols) o-cresol. | 500 Butarez 5 | 10 g. Al foil | 3 at 190–195 | 3,062.5 | 34.7 | .4 | 4.36 | 27.6 | 11.0 | 149 |
| 13 | do | 500 Buton 100 | 2.5 g. Al foil | 3 at 190–195 | 776 | 35.6 | .2 | 3.27 | 29.7 | 14.9 | 147 |
| 14 | 564 (6 mols) phenol | 439 L.O., 525 xylene. | 12 ml. BF₃·ether | 1.0 at 75, 0.2 at 75–100, 2.00 at 100. | 605 | 27.5 | 5.5 | 2.98 | 16.5 | 11.0 | [2] |
| 15 | 2707 (28.8 mols) phenol, 420 toluene. | 2110 S.O., 2,600 toluene. | 216 ml BF₃·ether | 1.0 at 34–86, 2.5 at 86–95. | 2,871 | 26.6 | 18.6 | 3.50 | 19.3 | 7.3 | [2] |
| 16 | 1125 (12 mols) phenol. | 879 corn oil, 900 xylene. | 90 ml. BF₃·ether | 2.0 at 120–122 | 1,235 | 28.8 | 43.1 | 4.30 | 23.5 | 5.3 | [2] |
| 17 | 648 (6 mols) o-cresol. | 439 L.O., 525 xylene. | 45 ml. BF₃·ether | 2.0 at 120–125 | 677 | 35.2 | 30.2 | 3.73 | 20.6 | 14.6 | [2] |
| 18 | 165 (1.5 mols) resorcinol, 350 toluene. | 296 methyl oleate, 350 toluene. | 30 ml. BF₃·ether | 2.5 at 95–105 | 380 | 22.1 | 22.3 | 6.41 | | | [2] |
| 19 | 488 (4 mols) 3,5-xylenol, 350 toluene. | 294 methyl linoleate, 350 toluene | do | 2.5 at 105–110 | 415 | 29.2 | 8.6 | 1.52 | 10.7 | 18.5 | [2] |
| 20 | 564 (6 mols) phenol, 525 xylene. | 439 L.O., 525 xylene. | 45 ml. BF₃·ether | 2.5 at 100–105 | 641 | 31.5 | 27.0 | 3.98 | 22.0 | 9.5 | [2] |
| 21 | 376 (4 mols) phenol, 88 xylene. | 264 octadecadienyl alcohol. | do | 2.0 at 120–125 | 362 | 27.0 | | | | | [2] |

See footnotes at end of table.

Table I—Continued
POLYENE-PHENOL ADDITION PRODUCTS—Continued

| Ex. No. | Grams phenol and ml. solvent | Grams polyene grams oil and ml. solvent | Catalyst | Hours at ° C. | Grams product | Percent by weight added phenol | Acid value | Percent weight as OH | Percent weight as $-\phi$OH | Percent weight as $\phi$O— | Softening point ° C. |
|---|---|---|---|---|---|---|---|---|---|---|---|
| 22 | 250 (2.32 mols) m,p-cresol. | 250 Example A | 20 ml. BF$_3$-ether | 1.3 at 26–115, 2 at 115–130. | 315 | 20.6 | 3.5 | 3.31 | 21.0 | 0 | (³) |
| 23 | 500 (3.33 mols) p,t-butylphenol. | 250 Example B | 30 ml. BF$_3$-ether | 2 at 120–125 | | | 2.6 | 3.15 | 27.8 | | (³) |
| 24 | 250 (1.1 mol) BPA, 250 bis(2-chloroethyl) ether. | 250 Example C | 20 ml. BF$_3$-ether | 4 at 100–105 | 353 | 29.2 | .8 | 3.83 | | | (²) |
| 25 | 350 cresylic acid No. 5.⁴ | 250 Example D | 15 ml. BF$_3$-ether | 2 at 160–165 | 349 | 28.4 | 1.6 | 2.77 | | | (²) |
| 26 | 500 (2.94 mols) o-phenylphenol. | 250 Example E | 20 ml. BF$_3$-ether | 5 at 120–125 | 370 | 32.5 | 6.1 | 3.20 | 32.0 | | |
| 27 | 376 (4 mols) phenol 24 xylene. | 280 linseed acids, 566 xylene. | 29 ml. BF$_3$-ether | .5 at 30–122, 1.25 at 122–125. | 384 | 27.0 | 116.0 | | | | (³) |

¹ 12 grams ALCL$_3$ were added in small portions over 0.5 hour holding at 20–26°C. with external cooling, then heated to 70°C. and held for 1 hour, added 10 g. ALCL$_3$ and held additional 1 hour.
² Viscous liquid.   ³ Semi-liquid.
⁴ Cresylic acid No. 5 contains 38–42% by weight 3,5-xylenol; 30–40% by weight 3,4-xylenol; 15–20% by weight ethyl phenols; 6–8% by weight 2,3-, 2,4-, and 2,5-xylenol; and 1–2% by weight cresols. The product is available from the Pitt Consol Chemical Company.

In general it has been found that mixtures in all relative proportions of (1) phenol addition products of butadiene polymers as described in the co-pending application, Serial No. 833,144 and as illustrated in Table I and (2) phenol addition products of the unsaturated materials including oils herein designated are suitable for reaction with resinous or nonresinous polyepoxides to give mixtures which are capable of conversion into insoluble, infusible products on the application of heat.

In accordance with the invention, the phenol addition polymers, and the phenol addition products of the designated unsaturated materials, may be admixed with both resinous and nonresinous polyepoxides and a catalyst to form stable mixtures quickly curable to solid infusible, insoluble products on the application of heat.

Illustrative of the epoxide compositions which may be employed in this invention are the complex epoxide resins which are polyether derivatives of polyhydric phenols with such polyfunctional materials as polyhalohydrins, polyepoxides, or epihalohydrins to form polymeric, polyhydric alcohols having alternating chains and aromatic nuclei connected to each other by ether linkages. Typical of these complex epoxide resins are the reaction products of bis(4-hydroxyphenyl) dimethyl methane (bisphenol A) with excess molar portions of epichlorohydrin.

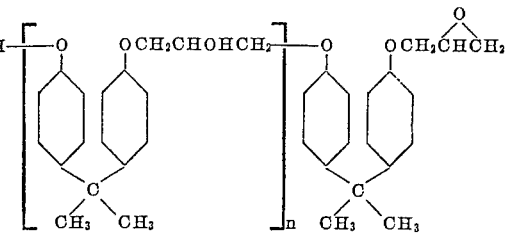

As used in the above formula, $n$ indicates the degree of polymerization and may have the value of 0 or a whole number. Typical of these complex epoxide resins are those marketed by the Shell Chemical Corporation under the trade names of Epon 828, Epon 836, Epon 1001, Epon 1004, Epon 1007, Epon 1009 and Epon 1031.

Another group of resinous polyepoxides useful in reaction with the hydroxyphenylated polymers are the glycidyl ethers of phenol formaldehyde condensates.

The epoxide compositions which may be used in preparing the compositions of this invention also include aliphatic polyepoxides which may be illustrated by such polyepoxides as the polymerization products obtained by polymerizing epoxyalkyl alkenyl ethers such as allyl glycidyl ether through the unsaturated portion to give the so-called polyallyl glycidyl ether (PAGE) having a chemical structure corresponding closely to the following formula:

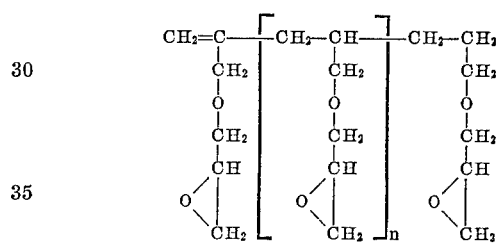

These products in which $n=0$ to about 7 are available in experimental quantities from the Shell Chemical Corporation.

Still other aliphatic polyepoxides which may be used are illustrated by the poly(epoxyalkyl) ethers of polyhydric alcohols. These polyepoxides, for instance, may be obtained by reacting a polyhydric alcohol with an epihalohydrin followed by dehydrohalogenation. Illustrative is the reaction, for example, of epichlorohydrin with glycerol in the presence of boron trifluoride to give an intermediate chlorohydrin which is dehydrohalogenated to give a mixed product represented by the following formula:

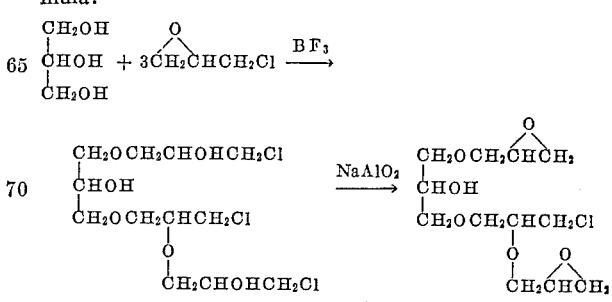

A commercial product of this type is Epon 812 having an equivalent weight to epoxide of approximately 150 and marketed by the Shell Chemical Corporation. The preparation of a large number of these mixed polyepoxides is described more fully in Zech's U.S. Patent 2,581,464.

Still other aliphatic polyepoxides which have been found to be valuable in reaction with the resinous polyhydric phenols in producing the cured products of this invention include diepoxybutane, diglycidyl ether, limonene diepoxide, and diepoxydicyclopentadiene.

Epoxidized polyolefins such as the epoxidized polybutadienes disclosed in patents 2,826,556; 2,829,131; and 2,829,135 comprise an additional family of aliphatic epoxides useful in the invention.

Catalysts which are active in inducing the epoxide groups of the polyepoxides to react with the phenolic hydroxyls of the hydroxyphenylated, phenyletherated polymers include alkaline materials such as sodium phenoxide and organic amines as well as certain acid-type catalysts such as the mineral acids, boron trifluoride, aluminum chloride, and zinc chloride.

Preferable catalysts, however, are the alkaline types such as the tertiary amines which tend to favor reaction of the epoxide group with phenolic hydroxyl groups as compared to the reaction of epoxide group with alcoholic hydroxyl groups, and the use of these tertiary amines in catalytic quantities induces negligible weaknesses towards water, alkali, and chemical resistance as a result of the presence of the amine.

Generally, it is desirable to employ a conversion temperature of between about 100 and 250° C.

In the formulation of products from mixtures of the hydroxyphenylated butadiene polymers, the hydroxyphenylated unsaturated materials including oils and the polyepoxides, wide variations are possible.

The invention generically contemplates mixtures of hydroxyphenylated butadiene polymers and the designated hydroxyphenylated unsaturated materials in all relative proportions. Typical formulations include 1% by weight hydroxyphenylated butadiene polymer and 99% hydroxyphenylated unsaturated material and conversely preferred formulations comprise from about ten to about ninety parts by weight hydroxyphenylated butadiene polymer and from about ninety to about ten parts by weight hydroxyphenylated unsaturated material. Moreover, the relative amounts of polyepoxide to hydroxyphenylated product is widely variable within the scope of the invention which embraces all proportions of such components.

The structures of any one of the individual components as well as the proportions of each of the ingredients may be varied widely to give the desired characteristics in the end product. The invention not only contemplates wide variation in the parts by weight of the hydroxyphenylated polyenes and parts by weight of polyepoxides by choosing the desired equivalent weight of hydroxyphenylated product to react with an equivalent weight of a chosen polyin a quantity as low as ½ to ⅕ of the equivalent of the phenolic hydroxyl group present in the hydroxyphenylated materials both below and above an equivalent amount of the particular polyepoxide. For example, infusible, insoluble products can be obtained by using a polyepoxide in a quantity as low as ½ to ⅕ of the equivalent of the phenolic hydroxyl content of the hydroxyphenylated product. On the other hand, the polyepoxide can be used in any quantity above the equivalent to the hydroxyphenylated product since the polyepoxides themselves will polymerize in the presence of the catalyst used to induce reaction of the epoxide group with phenolic hydroxyl groups. Thus, the invention embraces, for example, the use of four equivalents of a polyepoxide in reaction with one equivalent of phenolic group of a hydroxyphenylated product in which case one equivalent of the epoxide would react with the phenolic hydroxyl content and the other three equivalents of epoxide would self-polymerize in the presence of the catalyst so that the end product would be uniformly converted, infusible, insoluble material.

The use of such large excess of the polyepoxide amounts to preparing a modified epoxy resin conversion product and such modified epoxy resin conversion products have their properties appreciably altered when quantities as low as 5-10% of the hydroxyphenylated product are incorporated into the composition.

Another modification of the invention consists of using excessive amounts of the polyepoxide in relation to the equivalent amount of the phenolic hydroxyl content along with the proper catalyst to induce reactivity of the epoxide with the phenolic hydroxyl group, and in addition to these ingredients use another active hydrogen containing compound such as an aliphatic polyamine or a polybasic acid to be reacted with the excess quantity of epoxide. For example, a formulation might consist of 5 equivalents of the hydroxyphenylated polyene, 10 equivalents of a polyepoxide and a catalyst to induce reaction of the epoxide group with the phenolic hydroxyl groups. In such formulations it is possible to use an amine as an active hydrogen coupling reactant to give secondary and tertiary amine groups in reaction with the epoxide composition and have the secondary and tertiary amine groups formed by this cross-linking action act as catalyst in inducing the remaining epoxide groups of the hydroxyphenylated polyene.

In the formulation of products from mixtures of the hydroxyphenylated polyenes and hydroxyphenylated unsaturated material with polyepoxides it is often desirable to mix these ingredients with other additives. Such additives may be plasticizers used in cases where still greater flexibility is desired or they may be pigments and fillers added to give desired variations in physical properties and performance. Other organic resin forming materials may also be incorporated along with the mixture of hydroxyphenylated polyenes and hydroxyphenylated unsaturated material and polyepoxides. Typical resinous materials useful in this respect include the formaldehyde condensates of phenols, melamine and urea, polyester resins, alkyd resins and epoxy resin esters.

The Examples 28 through 50 described in the Table II entitled, "Polyepoxide Conversion of the Polyene-Phenol Addition Products" are illustrative of the reaction of polyepoxides with the mixtures of hydroxyphenylated budadiene polymers and hydroxyphenylated unsaturated oils.

Viscosities were measured with the Gardner Bubble Viscometer.

Film hardness was measured with Sward Hardness Rocker setting the value for flat glass plate at 100.

GL hardness-adhesion readings are in number of grams weight required to scratch the film surface in one case and to completely remove the film from the panel in the other case as read on the Graham-Linton Hardness Tester. The Graham-Linton instrument provides a means of adjusting various pressures of up to 2,000 grams on a sharp knife edge placed vertical to the film surface and dragged along the surface in this position.

The bend tests were run using a Mandrel set manufactured by Gardner Laboratory, Inc. Wet films of 0.003″ thickness were spread on 30 gauge, bright, dry finish coke, tin plates cut to 3 x 5 inch dimensions, cured by baking as indicated in the table and bent sharply around a steel rod of the size indicated in the column tabulating bend test results. The reading given in this column is the size of the rod around which the bend was made without any noticeable cracking of the film.

Other materials and abbreviations used in the tabulated data are described as follows:

Epon 1001: A bisphenol A-epichlorohydrin type polyepoxide having a softening point of 65-76° C. and an epoxide equivalent weight of 450-525.

Epon 828: A bisphenol A-epichlorohydrin type polyepoxide having a softening point of 8-12° C. and an epoxide equivalent weight of 190-210.

Epon X-701: A liquid polymer of allyl glycidyl ether described as polyallyl glycidyl ether (PAGE) having an epoxide equivalent weight of approximately 135.

Epon 812: A glycidyl ether prepared from the reaction of epichlorohydrin with glycerol containing an equivalent weight to epoxide of approximately 150.

DMP30: Tris (dimethylaminoethyl) phenol manufactured by Rohm & Haas Company.

MEK: Abbreviation for methyl ethyl ketone.

In the columns representing solvents and chemicals resistance, a number followed by a plus sign indicates that the test was discontinued at the number of hours given without any indication of how much longer the film would withstand the chemical in question. The minus sign following a number merely indicates that the resistance to the chemical or solvent in question is something less than the number given.

*Table II*
POLYEPOXIDE CONVERSION OF THE POLYENE-PHENOL ADDITION PRODUCTS

| No. | Composition of converting mixture | 0.003″ wet film baked | Rocker hardness | GL surface scratch | GL film removal | Bend test, in. | Viscosity Original | Viscosity After days (d) | Solvents and chemicals in hours at— 100° C. | Solvents and chemicals in hours at— 25° C. |
|---|---|---|---|---|---|---|---|---|---|---|
| 28 | 61% in toluene, 0.17 part Example 1, 1.83 parts Example 20, 1 part Epon 828, 0.06 parts DMP30. | 0.5 hour at 150°C. | 30 | 400 | 1,600 | ⅛ | A | C (1d), G(4d), J(5d), M(6d). | H₂O, 1−; 10% NaOH, 1−; 50% H₂SO₄, 24+; 100% acetic acid, 1−. | 10% NaOH, 72+; 50% H₂SO₄, 72+; 100% acetic acid, 1−; 30% aqueous NH₃, 72+; acetone, 1−. |
| 29 | 71% in toluene, 0.47 part Example 1, 1.53 parts Example 20, 1 part Epon 828, 0.06 part DMP30. | ----do---- | 62 | 400 | 1,550 | ⅛ | A | C(1d), I(4d), M(5d), Q(6d). | H₂O, 1+; 10% NaOH, 1−; 50% H₂SO₄, 24+; 100% acetic acid, 1. | 10% NaOH, 72+; 50% H₂SO₄, 72+; 100% acetic acid, 1−; 30% aqueous NH₃, 72+; acetone, 1−. |
| 30 | 55% in toluene, 0.96 part Example 1, 1.04 parts Example 20, 1 part Epon 828, 0.06 part DMP30. | ----do---- | 54 | 600 | 1,550 | ¾ | H | V(1d), Z4(4d), Z5(5d), Z6(6d). | H₂O, 72+; 10% NaOH, 24; 50% H₂SO₄, 24+; 100% acetic acid, 1−. | 10% NaOH, 72+; 50% H₂SO₄, 72+; 100% acetic acid, 1−; 30% aqueous NH₃, 72+; acetone, 1−. |
| 31 | 44% in toluene, 2.2 parts Example 1, 0.8 part Example 20, 1 part Epon 828, 0.04 part DMP30. | ----do---- | 52 | 600 | 1,350 | ⅛ | E | F(1d), L(4d), Q(5d), Q(6d). | H₂O, 72+; 10% NaOH, 24; 50% H₂SO₄, 72+ 100% acetic acid, 2−. | 10% NaOH, 72+; 50% H₂SO₄, 72+; 100% acetic acid, 72+; 30% aqueous NH₃, 72+, acetone, 1−. |
| 32 | 46% in 4:3 MEK and toluene, 1.49 parts Example 5, 1.51 parts Example 20, 6 parts Epon 1001, 0.09 part DMP30 | ----do---- | 26 | 400 | 1,350 | 3⁄16–⅛ | A3 | A(3d), A(4d), B(5d). | H₂O, 7+; 10% NaOH, 7+; 50% H₂SO₄, 72+; 100% acetic acid, 1−. | 10% NaOH, 72+; 50% H₂SO₄, 72+; 100+ acetic acid, 1−; 30% aqueous NH₃, 72+; acetone 1−. |
| 33 | 64+ in toluene, 2.47 parts Example 4, 2.53 parts Example 20. 3 parts Epon 828, 0.16 part DMP30. | ----do---- | 58 | 350 | 2,000 | ¼ | I | P(3d), S(4d), U(5d). | | |
| 34 | 45% in toluene, 3 parts Example 2, 1 part Example 16, 1 part Epon X-701, 0.05 part DMP 30. | ----do---- | 52 | 550 | 1,100 | ⅛ | F | F(3d), G(4d), G(5d). | H₂O, 46+; 10% NaOH, 28+; 50% H₂SO₄, 46+; 100% acetic acid, 4+. | 10% NaOH, 46+; 50+ H₂SO₄, 46+; acetic acid, 46+; 30+ aqueous NH₃ 46+; acetone 2+. |
| 35 | 41% in toluene, 9 parts Example 2, 1 part Example 17, 3 parts Epon X-701, 0.13 part DMP-30. | ----do---- | 68 | 600 | 1,050 | ⅛ | F | U(3d), W(4d), X(5d). | | |
| 36 | 47% in toluene, 9 parts Example 2, 1 part Example 18, 3 parts Epon X-701, 0.13 part DMP-30. | ----do---- | 70 | 600 | 1,200 | ⅛ | O | Z3(3d), Z5(4d) | | |
| 37 | 44% in 2:3 MEK and toluene, 3 parts Example 3, 1 part Example 14, 4 parts Epon 1001, 0.16 part DMP30. | ----do---- | 54 | 500 | 1,550 | ⅛ | A2 | M(3d), U(4d), V(5d) | | 10% NaOH, 46+; 50% H₂SO₄, 46+; 100% acetic acid, 1−; 30% aqueous NH₃, 46+; acetone, 1−. |
| 38 | 52% in xylene, 5 parts Example 3, 2 parts Example 19, 2 parts Epon 812, 0.045 part DMP-30. | ----do---- | 60 | 400 | 1,575 | ⅛ | F | V(3d), X(4d), Z(5d) | | |
| 39 | 57% in xylene, 1 part Example 6, 1 part Example 15, 1 part Epon 828, 0.06 part DMP30. | 0.5 hour at 175°C. | 38 | 350 | 1,550 | ⅛ | I | X(1d), Z(2d) | | |
| 40 | 50% in 2:1 xylene and toluene, 2 parts Example 7, 2 parts Example 21, 1 part Epon X-701, 0.05 part DMP30. | ----do---- | 56 | 300 | 1,450 | ⅛ | H | P(1d), S(2d), U(3d) | 10% NaOH, 45+; toluene, 45+.¹ | |
| 41 | 50% in xylene, 12.4 parts Example 14, 1.2 part Example 9, 5 parts Epon 828, 0.18 part DMP30. | ----do---- | 14 | 400 | 900 | ⅛ | A | E(1d) | 10%NaOH, 1; toluene, 45+.¹ | |
| 42 | 50% in xylene, 2 parts Example 8, 2 parts Example 16, 2 parts Epon 828, 0.06 part DMP30. | ----do---- | 38 | 400 | 900 | ¾ | A1 | A1(1d) | 10% NaOH, 0.5; toluene, 45+.¹ | |
| 43 | 50% in xylene, 1 part Example 10, 3 parts Example 20, 1 part Epon X-701, 0.05 part DMP30. | ----do---- | 20 | 300 | 1,100 | ⅛ | B | C(2d) | 10% NaOH, 0.5; toluene, 45+.¹ | |

See footnotes at end of table.

Table II—Continued

POLYEPOXIDE CONVERSION OF THE POLYENE-PHENOL ADDITION PRODUCTS—Continued

| No. | Composition of converting mixture | 0.003" wet film baked | Rocker hardness | GL surface scratch | GL film removal | Bend test, in. | Viscosity Original | Viscosity After days (d) | Solvents and chemicals in hours at— 100 °C. | Solvents and chemicals in hours at— 25° C. |
|---|---|---|---|---|---|---|---|---|---|---|
| 44 | 50% in xylene, 3 parts Example 11, 1 part Example 15, 1 part Epon X-701, 0.05 part DMP30. | 0.5 hour at 175° C. | 40 | 300 | 950 | ⅛ | B | C(1d), E(2d) | 10% NaOH, 2; toluene, 45+.[1] | |
| 45 | 53% in 50:50 MEK and xylene, 1 part Example 2, 3 parts Example 22, 4 parts Epon 1001, 16 parts DMP30. | 0.5 hour at 150° C. | 20 | 450 | 1,400 | ⅛ | A3 | A3(1d) separated. | $H_2O$, 20+;[2] 10% NaOH, 20+; 50% $H_2SO_4$, 90+; acetic acid, .5—; DMF, .5—. | |
| 46 | 43% in xylene, 3 parts Example 13, 1 part Example 23, 1 part Epon 812, .05 part DMP30. | ---do--- | 40 | 400 | 1,600 | ¾ | B | H(1d), I(2d) | $H_2O$, 90+;[2] 10% NaOH, 90+; 50% $H_2SO_4$, 90+; acetic acid, 90+; DMF, 90+.[3] | |
| 47 | 43% in xylene, 3 parts Example 2, 1 part Example 24, 1 part Epon X-701, .05 part DMP30. | ---do--- | 58 | 500 | 1,000 | ⅛ | H | N(1d), P(2d), R(3), U(6d), U-V(7d). | $H_2O$, 20+;[2] 10% NaOH, 20+; 50% $H_2SO_4$, 90+; acetic acid, 90+; DMF, 90+.[3] | |
| 48 | 44% in xylene, 1 part of Example 25, 1 part of Example 12, 1 part Epon 828, .06 part DMP30. | ---do--- | 58 | 300 | 700 | 1 | A5 | Gelled | $H_2O$, 20+;[2] 10% NaOH, 20+; 50% $H_2SO_4$, 90+; acetic acid, 90+; DMF, 90+.[3] | |
| 49 | 42% in xylene, 3 parts of Example 13, 1 part of Example 26, 1 part of Epon X-701, .04 part DMP30. | ---do--- | 52 | 500 | 1,000 | ⅛ | A-B | E(1d), J(4d), M(5d). | $H_2O$, 20+;[2] 10% NaOH, 20+; 50% $H_2SO_4$, 90+; acetic acid, 90+; DMF, 68+. | |
| 50 | 44% in xylene, 3 parts Example 13, 1 part Example 27, 1 part Epon X-701, 0.05 part DMP30. | ---do--- | 50 | 400 | 1,050 | ½-¾ | A | A(1d), A(4d), A(5d). | $H_2O$, 20+;[2] 10% NaOH, 20+; 50% $H_2SO_4$, 90+; acetic acid, 90+; DMF, 90+.[3] | |

[1] Softens but recovers on 10 minute exposure to air at room temperature.
[2] The aqueous systems destroyed adhesion of films to the glass plates otherwise films were unaffected.
[3] Some blistering otherwise okay.

It will be noted from the resistance data given to chemicals and solvents that the resistance of the new materials is outstanding. It will be observed that it is possible to formulate materials having excellent resistance to a highly polar organic material such as acetic acid, a relatively nonpolar material such as toluene, and to aqueous systems. It will be noticed that even though a large percentage of some of the conversion products are composed of the hydroxyphenylated vegetable oils which contain ester groups within their chemical structure, they are highly resistant to 10% aqueous sodium hydroxide at 100° C. as illustrated by thin films withstanding this chemical for periods of two days or more.

While the tabulated examples described the preparations and the properties of the new materials as protective coating films, similar conversions to infusible, insoluble products may be obtained in the absence of solvents to give adhesives, impregnants and molded articles.

I claim:

1. A mixture heat-convertible to form infusible, insoluble resinous products which comprises (A) a polyepoxide having an epoxy equivalency of at least one, (B) an hydroxyphenylated-phenyletherated polymer (1) being formed by the linkage of a phenol being free from radicals other than hydroxyl radicals and having less than 13 nuclear carbon atoms and at least one of the ortho and para position carbon atoms in the nucleus thereof unsubstituted into and throughout the chain of an ethylenically unsaturated polymeric material at the sites of the double bonds of said unsaturated polymeric material, about 50% of said linkages being through ethereal oxygen atoms provided by the hydroxyl groups of said phenol and about 50% of said linkages being through carbon-to-carbon saturated bonds between said polymer chain and the nucleus of said phenol at said ortho and para-positions, and (2) being characterized by solubility in aromatic hydrocarbon solvents, a total phenol content by addition linkage of at least about 10% by weight, an average of at least 2.5 phenolic hydroxyl groups per molecule of said hydroxyphenylated-phenyletherated polymer and a Durran softening point of at least 50° C., and said ethylenically unsaturated polymeric material (a) being selected from group consisting of homopolymers of diene monomers selected from the group consisting of butadiene, isoprene, chloroprene, piperylene and 2,3-dimethyl butadiene, copolymers of said diene monomers with each other, and copolymers of said diene monomers with vinyl monomeric compounds having a single vinyl radical therein, and (b) having at least an average of olefinic double bonds per molecule determined by the formula $y = 10/20x - 1$, where $y$ equals the number of double bonds and $x$ equals the number of phenolic hydroxyl groups per molecule of said phenol to be addition linked thereto, and (C) a hydroxyphenylated compound (1) being formed by the linkage of at least about 15% by weight of a phenol being free from radicals other than hydroxyl radicals and having less than 13 nuclear carbon atoms and at least one of the ortho and paraposition carbon atoms in the nucleus thereof unsubstituted into and throughout the chain of an unsaturated compound having at least two double bonds therein per molecule at the sites of said double bonds of said unsaturated material, a portion of said linkages being through ethereal oxygen atoms provided by the hydroxyl groups of said phenol and a portion of said linkages being through carbon-to-carbon saturated bonds between the chain of said unsaturated material and the nucleus of said phenol at said ortho and parapositions, and (2) being characterized by a phenol content of at least 10% by weight of said carbon-to-carbon linkage addition and an average of at least about 2 phenolic hydroxyls per molucule, said phenol additions being expressed in equivalents of phenol at unit weight 94, and said unsaturated compound being selected from the group consisting of (a) the unsaturated aliphatic acids having from about 12 to 22 carbon atoms per molecule (b) natural oils which are glycerol esters of the acids contemplated by (a); (c) synthetic esters of the acids contemplated by (a) with monohydric and polyhydric alcohols; (d) phenolic esters of the acids contemplated by (a); (e) unsaturated aliphatic alcohols containing from about 12 to 22 carbon atoms per molecule; and (f) esters of the unsaturated alcohols contemplated by (e) of carboxylic acids.

2. The mixture according to claim 1 in which said unsaturated polymeric material is polybutadiene.

3. The mixture according to claim 1 in which said unsaturated polymeric material is a copolymer of butadiene and styrene.

4. The mixture according to claim 1 in which said unsaturated compound is an unsaturated aliphatic acid having from about 12 ot about 22 carbon atoms per molecule.

5. The mixture according to claim 1 in which said unsaturated compound is a glycerol ester of an unsaturated aliphatic acid having from about 12 to about 22 carbon atoms per molecule.

6. The mixture according to claim 1 in which said polyepoxide is a condensation product of epichlorohydrin and bis (4-hydroxyphenyl) dimethyl methane.

7. An infusible, insoluble resinous material of enhanced strength, toughness, and chemical resistance prepared by heating to a temperature of between about 100° and about 250° C. a physical mixture comprising (A) a polyepoxide having an epoxy equivalency of at least one, (B) an hydroxyphenylated-phenyletherated polymer (1) being formed by the linkage of a phenol being free from radicals other than hydroxyl radicals and having less than 13 nuclear carbon atoms and at least one of the ortho and para-position carbon atoms in the nucleus thereof unsubstituted into and throughout the chain of an ethylenically unsaturated polymeric material at the sites of the double bonds of said unsaturated polymeric material, about 50% of said linkages being through ethereal oxygen atoms provided by the hydroxyl groups of said phenol and about 50% of said linkages being through carbon-to-carbon saturated bonds between said polymer chain and the nucleus of said phenol at said ortho and para-positions, and (2) being characterized by solubility in aromatic hydrocarbon solvents, a total phenol content by addition linkage of at laest about 10% by weight, an average of at least 2.5 phenolic hydroxyl groups per molecule of said hydroxyphenylated-phenyletherated polymer and a Durran softening point of at least 50° C., and said ethylenically unsaturated polymeric material (a) being selected from the group consisting of homopolymers of diene monomers selected from the group consisting of butadiene, isoprene, chloroprene, piperyline and 2,3-dimethyl butadiene, copolymers of said diene monomers with each other, and copolymers of said diene monomers with vinyl monomeric compounds having a single vinyl radical therein, and (b) having at least an average of olefinic double bonds per molecule determined by the formula $y = 10/2x - 1$, where $y$ equals the number of double bonds and $x$ equals the number of phenolic hydroxyl groups per molecule of said phenol to be addition linked thereto, and (C) a hydroxyphenylated compond (1) being formed by the linkage of at least about 15% by weight of a phenol being free from radicals other than hydroxyl radicals and having less than 13 nuclear carbon atoms and at least one of the ortho and para-position carbon atoms in the nucleus thereof unsubstituted into and throughout the chain of an unsaturated compound having at least two double bonds therein at the sites of said double bonds of said unsaturated material, a portion of said linkages being through ethereal oxygen atoms provided by the hydroxyl groups of said phenol and a portion of said linkages being through carbon-to-carbon saturated bonds between the chain of said unsaturated material and the nucleus of said phenol at said ortho and para-positions, and (2) being characterized by a phenol content of at least 10% by weight by said carbon-to-carbon linkage addition and an average of at least about 2 phenolic hydroxyls per molecule, said phenol additions being expressed in equivalents of phenol at unit weight 94, and said unsaturated compound being selected from the group consisting of (a) the unsaturated aliphatic acids having from about 12 to 22 carbon atoms per molecule (b) natural oils which are glycerol esters of the acids contemplated by (a); (c) synthetic esters of the acids contemplated by (a) with monohydric and polyhydric alcohols; (d) phenolic esters of the acids contemplated by (a); (e) unsaturated aliphatic alcohols containing from about 12 to 22 carbon atoms per molecule; and (f) esters of the unsaturated alcohols contemplated by (e) of carboxylic acids.

8. The infusible, insoluble resinous material according to claim 7 wherein said unsaturated polymeric material is polybutadiene.

9. The infusible, insoluble resinous material according to claim 7 wherein said unsaturated polymeric material is a copolymer of butadiene and styrene.

10. The infusible, insoluble resinous material according to claim 7 wherein said unsaturated compound is an unsaturated aliphatic acid having from about 12 to about 22 carbon atoms per molecule.

11. The infusible, insoluble resinous material according to claim 7 wherein said unsaturated compound is a glycerol ester of an unsaturated aliphatic acid having from about 12 to about 22 carbon atoms per molecule.

12. The infusible, insoluble resinous material according to claim 7 wherein said polyepoxide is a condensation product of epichlorohydrin and bis (4-hydroxyphenyl) dimethyl methane.

References Cited in the file of this patent
UNITED STATES PATENTS
2,502,245    Greenlee _____ Mar. 28, 1950